United States Patent [19]
Gontarz et al.

[11] 3,978,033
[45] Aug. 31, 1976

[54] DIFURFURYLIDENE CYCLOALKANONES AS PHOTOACTIVE PRODEGRADANTS FOR POLYOLEFINS

[75] Inventors: John A. Gontarz, Landenberg; Charles H. Nelson, West Chester, both of Pa.

[73] Assignee: ICI United States Inc., Wilmington, Del.

[22] Filed: Apr. 23, 1975

[21] Appl. No.: 570,520

[52] U.S. Cl.............................. 526/1; 260/32.8 A; 260/DIG. 43; 526/348; 526/352; 526/914
[51] Int. Cl.².................... C08K 5/15; C08F 8/00; C08F 110/02
[58] Field of Search............ 260/DIG. 43, 94.9 GC, 260/32.8 A, 30.4 R, 240 R; 204/159.2, 159.23

[56] References Cited
UNITED STATES PATENTS

| | | | |
|---|---|---|---|
| 3,679,777 | 7/1972 | Lambert | 260/DIG. 43 |
| 3,797,690 | 3/1974 | Taylor et al. | 260/DIG. 43 |

OTHER PUBLICATIONS
Chem. Abs. vol. 77, 1972, p. 4136h, Kampfer et al.

*Primary Examiner*—Eugene C. Rzucidlo

[57] ABSTRACT

Difurfurylidene cycloalkanones have been found to be useful as accelerators for the photodegradation of polyolefins.

4 Claims, No Drawings

DIFURFURYLIDENE CYCLOALKANONES AS PHOTOACTIVE PRODEGRADANTS FOR POLYOLEFINS

BACKGROUND OF THE INVENTION

1. Field of the Invention

The present invention relates generally to polyolefin compositions which are capable of being degraded upon exposure to light. More particularly, the present invention relates to polyolefin compositions which are degraded upon exposure to visible or ultraviolet light, said compositions comprising in addition to a polyolefin, a difurfurylidene cycloalkanone.

2. Description of the Prior Art

Polyolefins and copolymers thereof have previously been used as packaging materials and in agricultural applications, the latter including, for example, mulching films and seed tapes. It is known that these polymers undergo degradation and become fragile when exposed, for prolonged periods of time, to sunlight or other forms of ultraviolet radiation and, for many applications, radiation absorbing agents are added to the polymers in order to stabilize said materials and retard such aging. However, for many other applications, particularly those mentioned above, it is desirable to accelerate the aging of the film. This is particularly true in applications such as mulching films used in agriculture and horticulture and in disposable packaging applications such as films, bags, bottles, hollow articles, and cellulose sheet materials such as paper, cardboard, or regenerated cellulose which are coated or lined with polyolefins.

A variety of additives have previously been suggested for incorporation in polyolefin materials to accelerate the degradation thereof. However, to be useful on a practical, commercial scale the additive must result in a polyolefin composition having sufficient stability for its intended use as well as the capability of degrading in a reasonable period of time after use.

SUMMARY OF THE INVENTION

In accordance with the present invention, photodegradable polyolefin compositions are prepared comprising a polyolefin and a difurfurylindene cycloalkanone represented by the following formula:

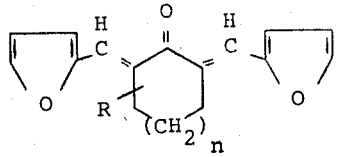

wherein
$n$ is equal to from 0 to 2, and
R is selected from the group consisting of hydrogen, branched or straight chain alkyl containing from 1 to about 10 carbon atoms, and cyclic alkyl containing from 4 to 7 carbon atoms.

DESCRIPTION OF THE PREFERRED EMBODIMENTS

As mentioned above, the present invention relates to compositions comprising a polyolefin and a difurfurylidene cycloalkanone. Each of these components is described in detail below.

Polyolefins

Any polyolefin known in the art may be utilized in the improved compositions of the present invention. As is well known, the term polyolefin refers to a class of polymers derived from polymerization of relatively simple olefins — i.e., unsaturated aliphatic hydrocarbons represented by the general formula $C_nH_{2n}$ wherein $n$ is an integer. The polyolefins which may be employed in the photodegradable compositions of the present invention include, for example, polyethylene, polypropylene, polybutylene and other homopolymers as well as copolymers of these olefins either with each other or with other alpha-olefins such as 1-octene and 1-octadecene. Particularly useful copolymers include those prepared from ethylene and propylene, butene or isoprene. If polyethylene is employed, it may be either of the high density or low density type.

Cycloalkanones

As was mentioned above, the photodegradable compositions of the present invention include, in addition to a polyolefin, a difurfurylidene cycloalkanone. The cycloalkanones which have been found to be useful in accordance with the present invention are those which may be represented by the formula:

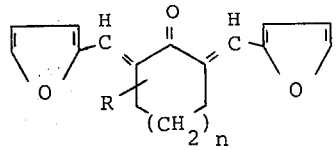

wherein
$n$ is equal to from 0 to 2, and
R is selected from the group consisting of hydrogen, branched or straight chain alkyl containing from 1 to about 10 carbon atoms, and cyclic alkyl containing from 4 to 7 carbon atoms.

When R is alkyl the alkyl substituent may be on any position in the cycloalkyl ring including those represented by $(CH_2)_n$ in the above formula.

These compounds are prepared by any method known in the art including, for example, by reacting a cyclic ketone containing from 5 to 7 carbon atoms with furfural in an alcoholic base. This reaction proceeds in accordance with the following general reaction wherein R and n are as defined above. As will be readily apparent to those skilled in the art, the R substituent cannot be an alkyl group in a position ortho to the oxygen (=O) group on the cycloalkanone.

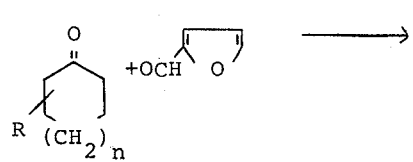

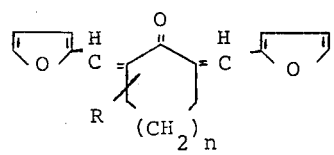

Cyclic ketones (cycloalkanones) which may be employed in carrying out this reaction include any compound coming within the above-mentioned formula. Representative compounds include, for example, the following:
cyclopentanone,
cyclohexanone,
cycloheptanone,
3-methyl cyclohexanone,
4-methyl cyclohexanone,
4-t-butyl cyclohexanone,
3-decyl cyclopentanone,
4-cyclohexylcyclohexanone, and
4-cyclobutylcycloheptanone.

All of these compounds are either commercially available or can be prepared quite readily by those skilled in the art from substituted dibasic acids or dinitriles in accordance with the following reaction wherein R is as indicated above, provided that there is only one R substituent which is other than hydrogen on any given compound, n is 0 or an integer, and M is a metal ion such as calcium when $n$ is 0 and cerium or thorium when $n$ is 1 or 2.

be used. For example, the desired amounts of the additive can be dry blended with the polymer or the additive, as a solution or dispersion, can be mixed with a solution or dispersion of the polymer in a suitable solvent. The amount of difurfurylidene cycloalkanone employed in the preparation of said photodegradable compositions should be equal to from about 0.05 percent to about 1.0 percent by weight based on the total weight of said composition. Below about 0.05 percent no significant improvement in photodegradation is noted and when greater than about 1.0 percent is utilized no further improvement is achieved.

It has been found that preferred results are achieved if the polyolefin and difurfurylidene cycloalkanone are combined in a suitable solvent. The solvent employed should have a low boiling point so that it may be conveniently removed from the resulting composition and it also must dissolve the difurfurylidene cycloalkanone. After the polyolefin and cycloalkanone are combined in the solvent, the solvent is removed, resulting in a composition comprising the polyolefin and cycloalkanone. Representative solvents which may be employed in the preparation of said composition include, for example, methylene chloride and chloroform.

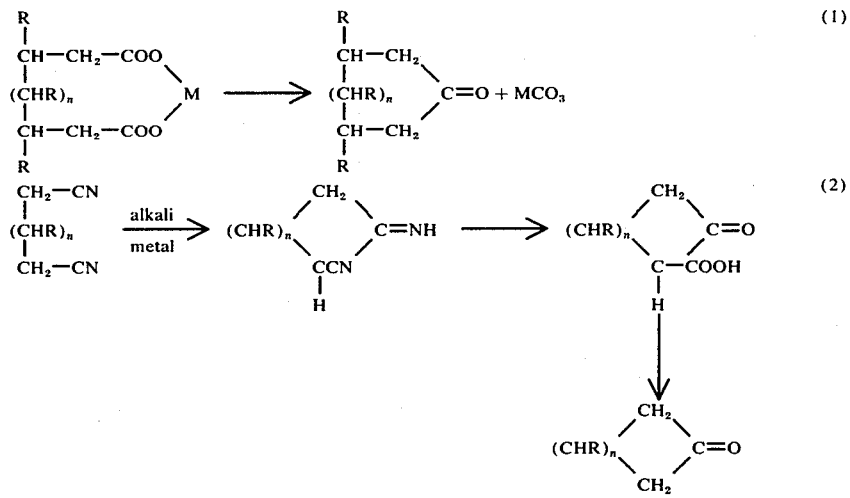

In preparing the difurfurylidene cycloalkanones used in carrying out the present invention at least 2 mols of furfural are reacted with each mol of the cycloalkanone. Preferred results are achieved when a slight excess — i.e., on the order of about 10 molar percent — of furfural is employed.

The reaction is carried out in the presence of an alcoholic base. Any alcohol, such as methanol, ethanol, isopropanol and the like, may be employed. Any base which is soluble in the alcohol, such as potassium hydroxide, sodium hydroxide or the like, may be utilized.

The reaction is carried out by combining the reactants in the alcoholic base and stirring the resulting reaction mixture at room temperature. The product precipitates from the reaction mixture.

In the preparation of the photodegradable compositions of the present invention, the cycloalkanone is combined with a polyolefin by any suitable means. The difurfurylidene cycloalkanone may be incorporated into the polymer by any of the techniques known for blending a solid or a liquid with a polymer prior to formation of the polymer into the form in which it will The resulting composition may be used in the preparation of films and molded articles as well as in coatings which are applied to a variety of substrates. Preferably, the composition is formed into film of any desired thickness by conventional methods including, for example, by extrusion of the molten material into a tube or cast film, by casting a solution of the polymer in a suitable solvent onto a rotating drum or by other methods. The thickness of the film may vary over a wide range depending upon the use for which the film is intended. As mentioned above, the advantage of the compositions of the present invention is that, when exposed to either visible or ultraviolet light, the materials degrade. This degradation is indicated by the embrittlement of the composition upon exposure to radiation as defined above. Preferred degradation occurs when the material is exposed to ultraviolet light.

The compositions of the present invention are particularly useful in the preparation of mulching films for use in agricultural applications and in the preparation of seed tapes. They are also useful in disposable packages such as packaging films, bags and bottles.

In order to describe the present invention so that it may be more clearly understood, the following examples are set forth. These examples are set forth primarily for the purpose of illustration and any enumeration of detail contained therein should not be interpreted as a limitation on the concept of the present invention. In the examples all parts refer to parts by weight.

In the examples, the compositions were tested for degradability by preparing molded plaques therefrom on a conventional Carver press equipped with means for heating the plates thereof.

The radiation source employed in the examples was a conventional fluorescent sunlamp-blacklamp unit.

Embrittlement of the samples, i.e., degradation of the polymer, was determined by periodically removing a sample of the plaque prepared from the composition from the radiation source, bending said sample to 180°, and measuring the exposure time required until the sample when bent as indicated would break.

Example 1 is representative of the preparation of the difurfurylidene cycloalkanones which may be used in accordance with the present invention. The remaining examples illustrate compositions of the present invention and photodegradable materials prepared therefrom.

EXAMPLE 1

Into a suitable reaction vessel, there were added
50 ml of methanol,
2.0 grams of sodium hydroxide,
12.5 grams (0.08 mol) of 4-t-butylcyclohexanone, and
16.3 grams (0.17 mol) of furfural.

The resulting solution was stirred at room temperature and the resulting precipitate was removed by filtration. The precipitate was recrystallized from hot isopropanol and dried resulting in 15.2 grams of a yellow crystalline solid having a melting point of 137.5°–139°C. The product was identified as 2,6 difurfurylidene-4-t-butylcyclohexanone.

Analysis of the product indicated 77.45 percent carbon and 6.96 percent hydrogen. These results compared favorably with the theoretical percentages calculated for $C_{20}H_{22}O_3$ as 77.34 percent carbon and 7.14 percent hydrogen.

EXAMPLE 2

A photodegradable composition was prepared by combining
100 parts of polypropylene,
0.5 parts calcium stearate,
0.05 parts of the product prepared in Example 1, and
100 parts of methylene chloride.

The composition was stirred and heated to remove the solvent. The sample of the resulting composition was then compression molded on a Carver press at 205°C. to form a sheet having a thickness of 0.06 inches. The resulting film was exposed to a fluorescent sunlamp-blacklamp unit and the time to embrittlement determined. This time was equal to 144 hours. By comparison, a control sample which did not contain the difurfurylidene cycloalkanone required 276 hours to become embrittled.

EXAMPLE 3

Employing the procedure described in Example 2, additional compositions were prepared by combining varying amounts of the difurfurylidene cycloalkanone prepared in Example 1 with polypropylene, preparing films therefrom, and testing as defined above. The results of these experiments are given in the following table:

TABLE I

| Example | Amount of Dione | Time to Embrittlement |
|---|---|---|
| 3 | 0.1% | 204 hours |
| 4 | 0.5% | 216 hours |
| 5 | 1.0% | 192 hours |
| Control | — | 276 hours |

EXAMPLE 4

A photodegradable composition was prepared by combining,
100 parts of high density polyethylene,
0.5 parts calcium stearate,
100 parts of methylene chloride, and
varying amounts of the product prepared in Example 1 as indicated in the following table.

The composition was treated and sheets molded therefrom as described in Example 2 except that the temperature employed was 175°C. The resulting film was exposed to a fluorescent sunlamp-blacklamp unit and the time to embrittlement determined. The results on each of the sheets and on a control sample which did not contain the difurfurylidene cycloalkanone are also given in the following table.

TABLE II

| Parts of Dione | Embrittlement (Hours) |
|---|---|
| None | 1,476 |
| 0.05 | 1,296 |
| 0.10 | 1,064 |
| 0.15 | 824 |
| 1.0 | 656 |

EXAMPLE 5

Several additional difurfurylidene cycloalkanones useful in the present invention were also evaluated. The compounds are identified in the following table.

TABLE III

| Compound | Name | Structure |
|---|---|---|
| 1 | 2,6-difurfurylidene-cyclohexanone | |
| 2 | 2,5-difurfurylidene-cyclopentanone | |

TABLE III-continued

| Compound | Name | Structure |
|---|---|---|
| 3 | 2,7-difurfurylidene-cycloheptanone | |
| 4 | 2,6-difurfurylidene-4-t-butylcyclohexanone | |

To a composition comprising
100 parts of high density polyethylene,
0.5 parts of calcium stearate, and
100 parts of methylene chloride,
each of the above compounds was added at two amounts — 0.1 parts and 0.5 parts. The compositions were stirred, heated and sheets were molded therefrom and tested as described in Example 4. The results are given in the following table.

TABLE IV

| Compound | Amount | Embrittlement (Hours) |
|---|---|---|
| None | — | 1,362 |
| 1 | 0.1 | 510 |
| 1 | 0.5 | 462 |
| 2 | 0.1 | 762 |
| 2 | 0.5 | 906 |
| 3 | 0.1 | 678 |
| 3 | 0.5 | 450 |
| 4 | 0.1 | 426 |
| 4 | 0.5 | 582 |

EXAMPLE 6

The compounds identified in Example 5 were also evaluated in a composition comprising
100 parts of polypropylene,
0.5 parts of calcium stearate, and
100 parts of methylene chloride.
Each of the compounds was added to this composition at 0.1 parts, at 0.25 parts and at 0.5 parts, and sheets were prepared and tested as described in Example 2. The results are given in the following table. With compound 2, the top layer of the sheet was completely degraded and the light could not penetrate through to the rest of the film in the time of this test.

TABLE V

| Compound | Amount | Embrittlement (Hours) |
|---|---|---|
| — | — | 270 |
| 1 | 0.1 | 198 |
| 1 | 0.25 | 210 |
| 1 | 0.5 | 195 |
| 2 | 0.1 | 210 |
| 2 | 0.25 | 270 |
| 2 | 0.5 | 306 |
| 3 | 0.1 | 186 |
| 3 | 0.25 | 174 |
| 3 | 0.5 | 186 |
| 4 | 0.1 | 261 |
| 4 | 0.25 | 234 |
| 4 | 0.5 | 210 |

What is claimed is:
1. A photodegradable composition comprising:
   a. a polyolefin, and from about .05 to 1.0 percent by weight based on the total weight of said composition of
   b. a difurfurylidene cycloalkanone having the following formula:

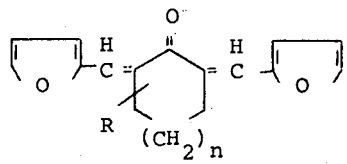

wherein
   $n$ is equal to from 0 to 2, and
   R is selected from the group consisting of hydrogen, branched or straight chain alkyl containing from 1 to about 10 carbon atoms, and cyclic alkyl containing from 4 to 7 carbon atoms.
2. A composition, as claimed in claim 1, wherein the polyolefin is polyethylene.
3. A composition, as claimed in claim 1, wherein the cycloalkanone is 2,6 difurfurylidene-4-t-butylcyclohexanone.
4. A film prepared from the composition of claim 1.

* * * * *